(12) United States Patent
Hofer

(10) Patent No.: US 6,618,559 B1
(45) Date of Patent: Sep. 9, 2003

(54) ZOOM LENS POSITION CALIBRATION

(75) Inventor: Gregory V. Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/192,943

(22) Filed: Jul. 11, 2002

(51) Int. Cl.[7] ............................. G03B 5/00; G02B 15/14
(52) U.S. Cl. ....................... 396/87; 359/696; 348/240.3
(58) Field of Search ............................. 396/85, 86, 87, 396/89; 359/696–698; 348/240.3

(56) References Cited

U.S. PATENT DOCUMENTS

| | | | |
|---|---|---|---|
| 4,423,934 A | * | 1/1984 | Lambeth et al. .......... 396/89 X |
| 5,515,129 A | | 5/1996 | Miyazawa et al. |
| 5,943,513 A | | 8/1999 | Kim |
| 6,377,752 B1 | * | 4/2002 | Ishii ............................. 396/87 |

OTHER PUBLICATIONS

U.S. patent application Ser. No. 10/022,781 filed Dec. 13, 2001 for "Zoom Lens Control System And Method" of Gregory V. Hofer et al.

* cited by examiner

Primary Examiner—W. B. Perkey

(57) ABSTRACT

A focal length position of a zoom lens is calibrated by performing at least one focal length adjustment, collecting a time period measurement for each focal length adjustment, and calculating a calibrated time to zoom to a desired focal length based on the time period measurements.

33 Claims, 10 Drawing Sheets

ZOOM LENS POSITION CALIBRATION

FIELD OF THE INVENTION

This invention relates generally to zoom lenses and more specifically to calibration of the zoom lens position.

BACKGROUND

Zoom lenses are employed by numerous types of imaging devices such as still and video cameras, etc. Some types of zoom lens assemblies include imprecise and/or low-resolution components such as drive systems or zoom position sensors which are employed because of their other advantages, such as low cost. Because of these imprecise and/or low-resolution components, a zoom lens assembly with a discrete number of zoom positions (or focal lengths) may come to rest at an offset from the desired zoom positions. Further, the direction in which a zoom position is approached by the zoom lens affects the direction of the offset from the desired zoom position. For example, if a zoom lens assembly includes focal lengths of 10 mm, 12 mm, and 14 mm among the discrete zoom positions measured by its discrete position sensor, and the zoom lens assembly is zoomed to the 12 mm position, the actual resulting offset from 12 mm differs depending upon the direction from which the zoom lens approaches 12 mm. If the zoom lens zooms from 10 mm to 12 mm, it may overshoot the 12 mm position by an offset, coming to rest at an actual focal length of 12.3 mm, for example. If the zoom lens zooms from 14 mm to 12 mm, it may overshoot the 12 mm position by an offset in the other direction, coming to rest at an actual focal length of 11.8 mm.

Thus, a zoom lens with this type of discrete position sensor can typically be positioned only at small offsets from the predetermined zoom positions, with the direction of offset dependent upon the direction the zoom lens was last traveling.

SUMMARY

An embodiment of the invention enables a zoom lens with discrete focal length position sensors to be positioned at arbitrary locations between the predetermined zoom positions. This is accomplished by calibrating the movement of the zoom lens to determine the time required to move past the predetermined zoom positions to reach a desired location or focal length. Thus, the zoom lens can be adjusted to many focal lengths based on the discrete focal length position sensors and the duration of movement. This allows the zoom lens to reach a greater number of focal lengths than the few zoom positions provided by the discrete sensors. Using this zoom lens calibration, the zoom lens can also be accurately positioned without overshoot offsets regardless of the last direction of travel. This eliminates the need to perform a zoom direction reversal at the end of certain zoom operations.

BRIEF DESCRIPTION OF THE DRAWING

Illustrative and presently preferred embodiments of the invention are shown in the accompanying drawing, in which.

DESCRIPTION

Figure 1:
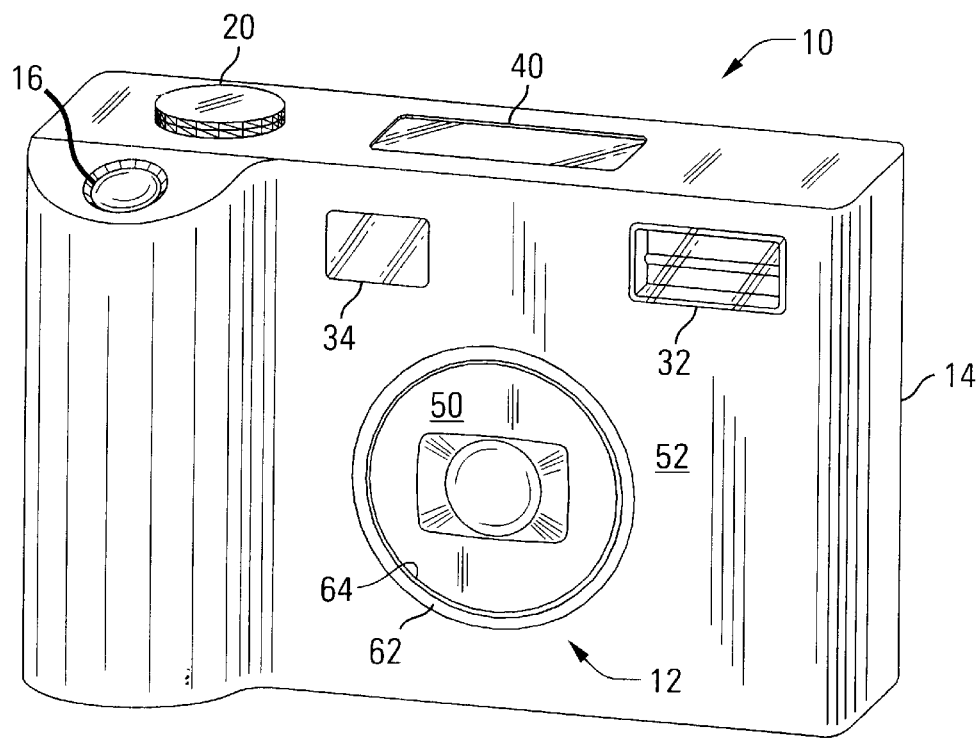
FIG. 1 is an isometric front view illustration of an exemplary imaging device with a zoom lens, with the zoom lens retracted.

The drawing and description, in general, disclose a method of calibrating a zoom lens assembly having discrete focal length position sensors. These imprecise and/or low-resolution focal length position sensors typically limit the zoom lens to a small number of zoom positions. Calibrating a zoom lens having discrete focal length position sensors as described herein enables the zoom lens to be positioned at a larger number of zoom positions, even those lying between the zoom positions corresponding to the discrete focal length position sensors.

Furthermore, these sensors typically require that the zoom lens always reach a zoom position from the same direction. As a result, when zooming in one of the directions, a zoom direction reversal must be performed after reaching the desired zoom position. This zoom direction reversal at the end of zoom operations in one direction can be annoying and distracting to the camera user. The problem of zoom lens reversal is described in U.S. patent application Ser. No. 10/022,781, filed Dec. 13, 2001, entitled "ZOOM LENS CONTROL SYSTEM AND METHOD," which is incorporated herein by reference for all that it discloses.

When the zoom lens reaches a zoom position, the power is turned off to the DC zoom drive motor or the motor coil leads are electrically shorted to dynamically brake, but the zoom lens continues to move over a short distance referred to herein as the braking distance. This causes an offset from the actual zoom position, with the direction of the offset dependent upon the last direction of travel of the zoom lens. The zoom lens calibration enables the zoom lens to be adjusted to zoom lens positions from either direction without offset errors. Thus, zoom lens calibration enables more accurate focal length adjustments, with a greater number of focal length positions attainable for zoom lenses having discrete focal length position sensors.

A traditional definition of the term focal length is the distance from the focal point where parallel image light rays converge to the lens, although similar definitions exist with some differences which are equally applicable herein, as long as they vary the magnification of objects in the field of view and have an impact on the focus lens position. The zoom position of a zoom lens assembly is typically indicated by the focal length, which is generally measured in millimeters (mm). Because the exemplary optical device discussed herein is a digital camera, a common focal length range of 7 mm to 18 mm is given, rather than the higher values in the focal length range of a 35 mm zoom lens. Digital cameras have photodetectors which are typically much smaller than a 35 mm negative. Therefore, the lenses can also be smaller, with correspondingly smaller focal lengths to produce the same magnification.

The zoom lens may be used in any optical device requiring an optical zoom capability, including imaging devices like cameras. Although the zoom lens and its control and operation will be described herein with respect to a digital camera, it is important to note that the zoom lens and its control and operation is not limited to use with any particular device. Before describing the zoom lens calibration in detail, an exemplary digital camera with a zoom lens having discrete focal length position sensors will be described.

Figure 2:
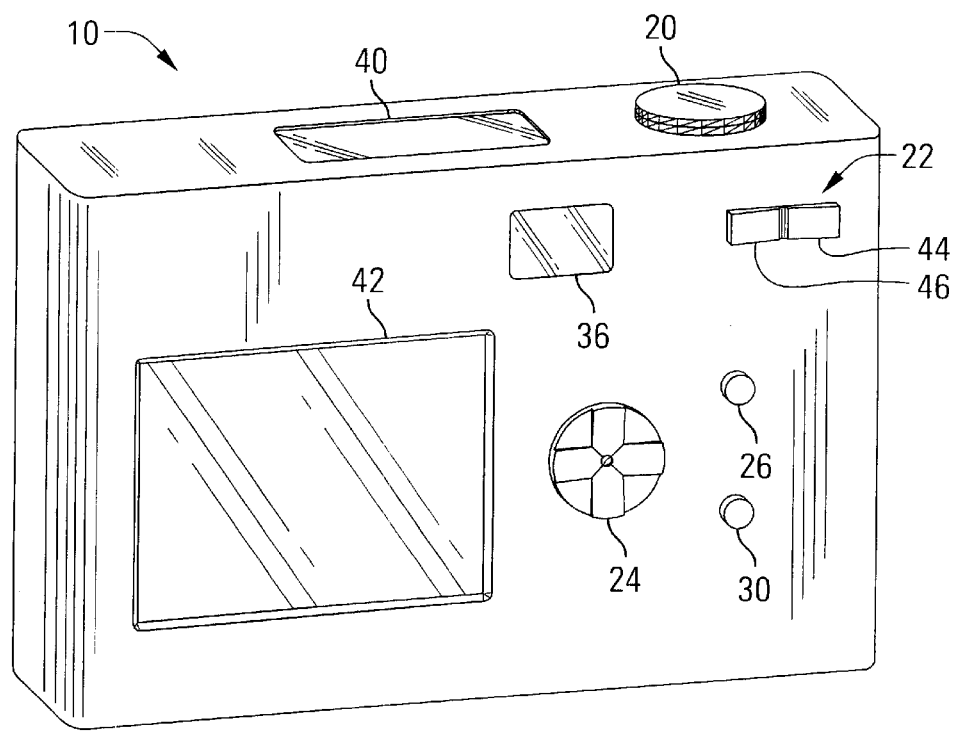
FIG. 2 is an isometric rear view illustration of the exemplary imaging device of FIG. 1.

Referring now to FIGS. 1 and 2, an exemplary digital camera 10 which includes a zoom lens 12 will be described. The digital camera 10 comprises a housing portion or body 14 which is sized to receive the various systems and components required by the digital camera 10. For example, in the embodiment shown and described herein, the body 14 is sized to receive the zoom lens 12, a photodetector, a storage device to store the image data collected by the photodetector, and an image processing system to process and format the image data. The zoom lens 12 is located in the body 14 to allow light to enter the digital camera 10. The body 14 may also be sized to receive a power source such as a battery. Control buttons such as a shutter control button 16, a mode dial 20, a zoom control switch 22, and others (e.g., 24, 26, and 30) as needed are provided on the outside of the body 14. The digital camera 10 preferably includes an illumination system such as a flash 32 mounted on the outside of the body 14. Viewfinder windows 34 and 36 and display devices 40 and 42 are also located on the outside of the body 14. Each of the foregoing systems and devices will now be described.

Image light enters the digital camera 10 through the zoom lens 12. The photodetector detects the image light focused thereon by the zoom lens 12 and comprises a CCD, although other devices may be used. A typical CCD comprises an array of individual cells or pixels, each of which collects or builds-up an electrical charge in response to exposure to light. Since the quantity of the accumulated electrical charge in any given cell or pixel is related to the intensity and duration of the light exposure, a CCD may be used to detect light and dark spots in an image focused thereon.

The term image light as used herein refers to the light, visible or otherwise, that is focused onto the surface of the photodetector array by the zoom lens 12. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital data then may be processed and/or stored as desired.

A storage device is located in the body 14 of the digital camera 10 to store the image data collected by the optical imaging assembly. The storage device comprises a removable rewriteable non-volatile memory, or may comprise a random access memory (RAM), or a magnetic, optical, or other solid state storage medium. An image processing system is located in the body 14 of the digital camera 10 to process and format the image data, either before or after storage in the storage device. The image processing system preferably comprises a microprocessor and associated memory. Alternatively, the image processing system may comprise a hard-coded device such as an application specific integrated circuit (ASIC). The image processing system processes image data to scale images for display on a graphical display device 42, among other tasks. For example, the image processing system also performs filtering and de-mosaic functions.

The graphical display device 42 comprises a liquid crystal display (LCD) or any other suitable display device. An alphanumeric display device 40 on the digital camera 10 also comprises an LCD or any other suitable display device, and is used to indicate status information, such as the number of images which can be captured and stored in the storage device, and the current mode of the digital camera 10.

The digital camera 10 may also include other components, such as an audio system. However, since digital cameras are well-known in the art and could be provided by persons having ordinary skill in the art after having become familiar with the teachings of the present invention, the digital camera 10 utilized in one embodiment of the present invention, as well as the various ancillary systems and devices (e.g., battery systems and storage devices) that may be utilized in one embodiment of the present invention will not be described in further detail herein.

During operation of the digital camera 10, the digital camera 10 is turned on and off by one of the control buttons such as the mode dial 20, and a mode is selected, such as a still image capture mode or a video capture mode. The digital camera 10 is oriented with the zoom lens 12 directed at a subject. The subject may be monitored either through a viewfinder 34 and 36, or on the graphical display panel 42. The focal length of the zoom lens 12 is adjusted by pressing a control button such as the zoom control switch 22. For example, when one side 44 of the zoom control switch 22 is pressed, the focal length of the zoom lens 12 increases to zoom in on the subject. When the other side 46 of the zoom control switch 22 is pressed, the focal length of the zoom lens 12 decreases to zoom out from the subject.

Note that the term "zoom in" as used herein refers to increasing the focal length towards the telephoto position to magnify an image, and the term "zoom out" refers to decreasing the focal length.

A focus region in the viewfinder 34 and 36 is directed at a focus object, an object in the field of view which is to be brought into focus, and focus lens elements in the zoom lens 12 are adjusted to focus image light from the focus object onto the photodetector. When the digital camera 10 is properly oriented, zoomed and focused, the shutter control button 16 is pressed. The flash 32 illuminates the subject, if needed. The photodetector then converts the image light directed thereon by the zoom lens 12 into electrical image data, which are stored in the storage device. The image processing system then processes the image data and displays the captured image on the display device 42.

Figure 3:
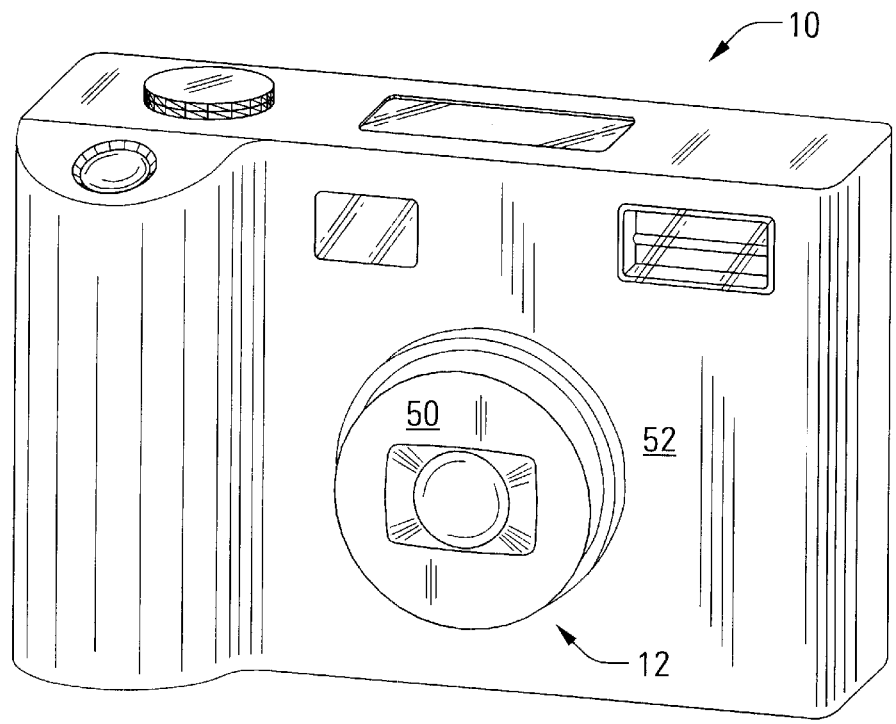
FIG. 3 is an isometric front view illustration of the exemplary imaging device of FIG. 1 with the zoom lens extended to the wide angle position.
Figure 4:
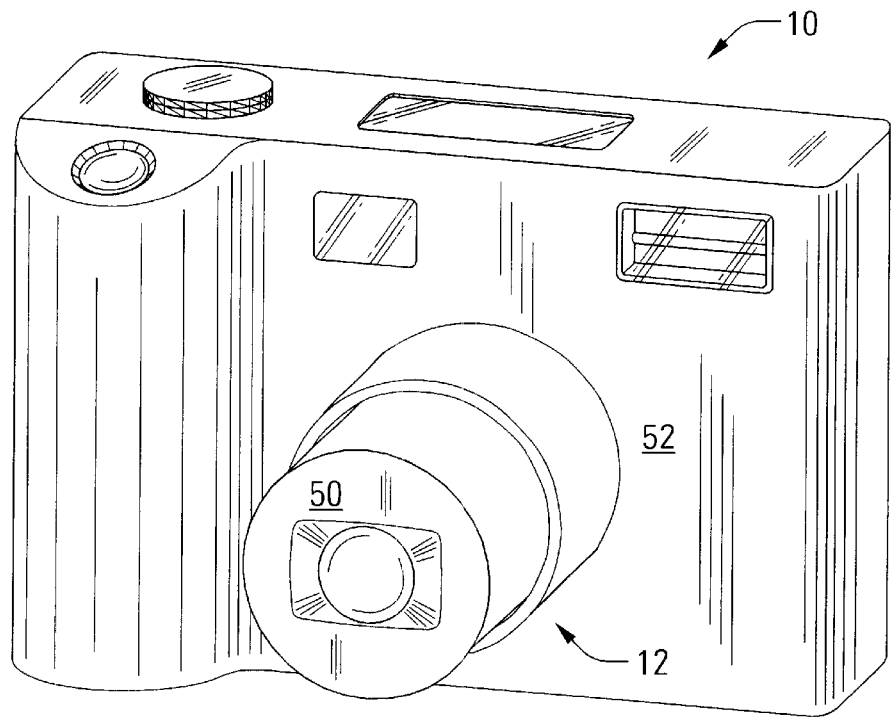
FIG. 4 is an isometric front view illustration of the exemplary imaging device of FIG. 1 with the zoom lens extended to the telephoto position.
Figure 5A:
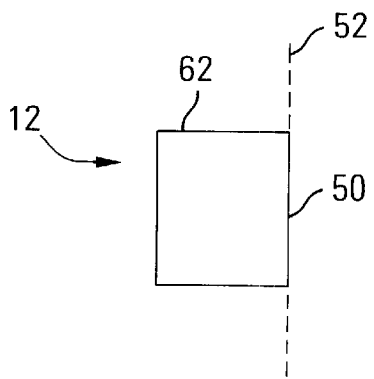
FIG. 5a is a side illustration of an exemplary zoom lens assembly in the retracted position.
Figure 5B:
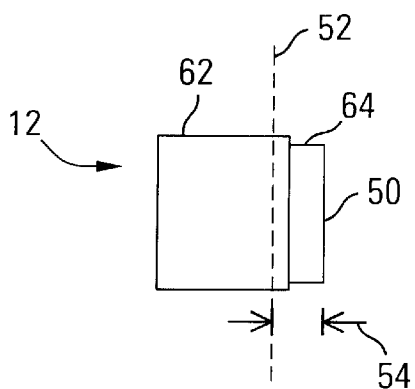
FIG. 5b is a side illustration of an exemplary zoom lens assembly extended to the wide angle position.
Figure 5C:
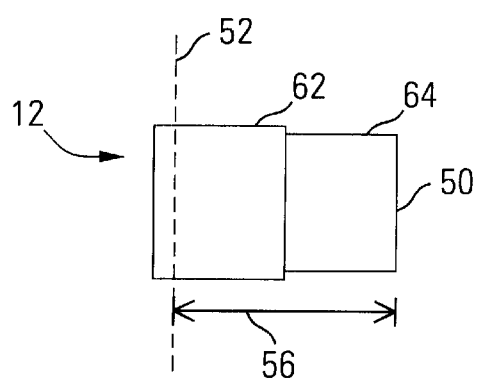
FIG. 5c is a side illustration of an exemplary zoom lens assembly extended to the telephoto position.

Note that the zoom lens 12 in an exemplary embodiment is retractable, that is, the zoom lens 12 can be retracted into the body 14 of the digital camera 10 so that the front 50 of the zoom lens 12 is substantially flush with the front 52 of the digital camera 10, as illustrated in FIGS. 1 and 5a. The zoom lens 12 is retracted when the digital camera 10 is turned off to minimize the size of the digital camera 10 and to prevent damage to the zoom lens 12. When the digital camera 10 is turned on and the zoom lens 12 is zoomed to its smallest focal length, capturing the widest angle possible, the zoom lens 12 extends a small distance 54 from the front 52 of the digital camera 10, as illustrated in FIGS. 3 and 5b. When the zoom lens 12 is zoomed to its greatest focal length, extending to the telephoto position, the zoom lens 12 extends a larger distance 56 from the front 52 of the digital camera 10, as illustrated in FIGS. 4 and 5c.

Again, it is important to note that calibration of the zoom lens 12 is not limited to use with any particular optical or imaging device, and is thus not limited to the details given above for the exemplary digital camera 10. Furthermore, the zoom lens 12 is not limited to the exemplary embodiment discussed in detail herein, but may be adapted as desired. For example, the exemplary zoom lens is described herein as having three barrels, but may have any alternative configuration. The zoom positions or focal lengths of the zoom lens 12 may also reversed, so that the most extended position of the zoom lens 12 would be the wide angle position rather than the telephoto position, thus reversing FIGS. 3 and 4.

Figure 6:
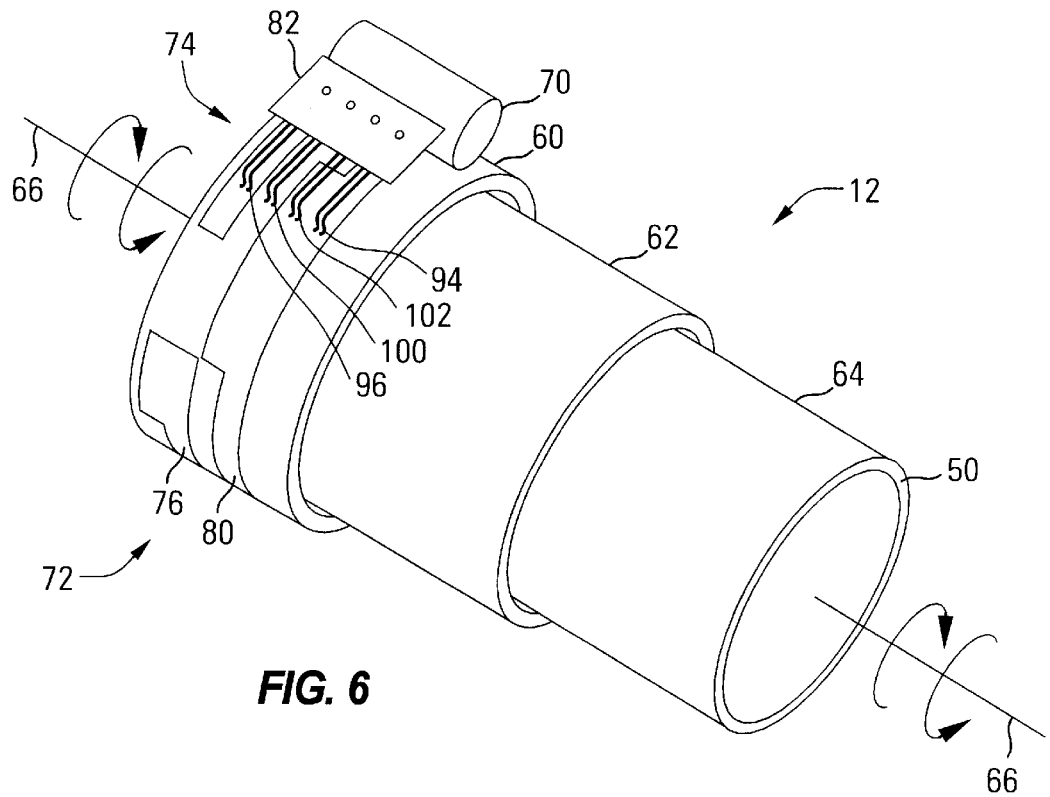
FIG. 6 is an illustration of an exemplary zoom lens assembly with a zoom position encoder.

Referring now to FIG. 6, the zoom lens 12 will be described in more detail. An exemplary embodiment of the zoom lens 12 has three barrels 60, 62, and 64, two of which (62 and 64) extend out of the body 14 of the digital camera 10 as the focal length is adjusted, and one 60, the outermost barrel, which remains inside the digital camera 10. The outermost barrel 60 rotates around the optical axis 66 of the zoom lens 12, thereby extending the inner barrels 62 and 64 to adjust the focal length. The zoom lens 12 also includes focus lens elements which may comprise one or more lenses to adjust the focus of the zoom lens 12, and which are automatically adjusted by one or more focus lens motors. The zoom lens assembly may include imprecise and/or low-resolution components such as a direct current (DC) zoom drive motor 70 to adjust the focal length and a zoom sensor having a code ring 72 and a set of electrically conductive contacts 74 to determine discrete focal length positions.

Using a DC zoom drive motor 70 inexpensively provides greater torque than more precise alternatives such as a stepper motor, enabling the zoom lens 12 to be retracted into the body 14 of the digital camera 10. However, the position of the DC zoom drive motor 70 cannot be directly controlled. Thus, the zoom sensor is provided to measure the focal length as it is changed. A code ring 72 in the zoom sensor is wrapped around the outermost barrel 60 and consists of a set of electrically conductive surfaces (e.g., 76 and 80) forming a pattern around the barrel 60. The set of electrically conductive contacts 74 are mounted in place over the code ring 72, for example on a printed circuit board 82, so that the contacts 74 press against the code ring 72. The barrel 60 and the code ring 72 are rotated around the optical axis 66 of the zoom lens 12 by the zoom drive motor 70 to adjust the focal length, while the set of electrically conductive contacts 74 remain fixed in place. Therefore, the rotating code ring presents a changing pattern which the electrically conductive contacts 74 detect, and the pattern can be decoded to indicate the current focal length of the zoom lens 12 in discrete increments.

Figure 7:
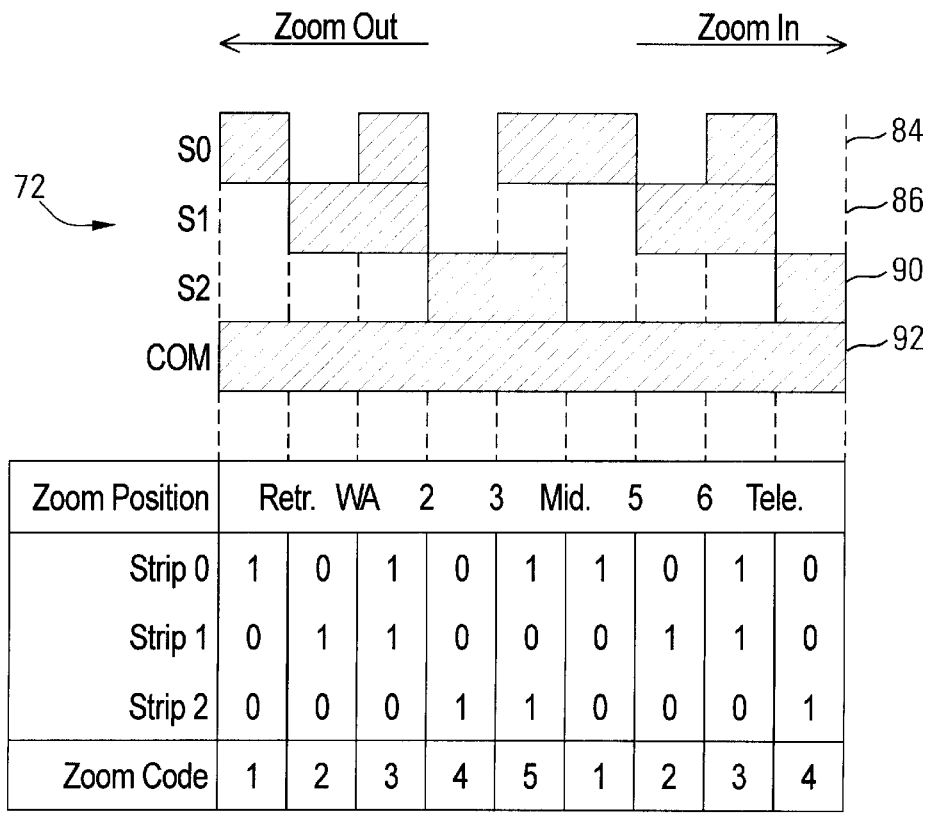
FIG. 7 is a chart illustrating an exemplary code ring for the zoom position encoder of FIG. 6.

An exemplary code ring 72 is illustrated in FIG. 7 as it would appear when flattened rather than wrapped around the barrel 60 in the zoom lens 12. The exemplary code ring consists of four rows or strips 84, 86, 90, and 92 placed side by side, with some portions being substantially electrically conductive and other portions being substantially electrically nonconductive. (In FIG. 7, the electrically conductive portions are shaded.) Three of the strips 84, 86, and 90 present the changing pattern of electrical conductivity and the last strip 92 is a common strip which is uniformly electrically conductive.

The three encoded strips, strip 0 (S0) 84, strip 1 (S1) 86, and strip 2 (S2) 90 may represent binary encoded numbers which are incremented in order. Alternatively, the three encoded strips 84, 86, and 90 may have any suitable pattern. The zoom lens 12 has a given number of discrete focal lengths or zoom positions, seven in this example, ranging from wide angle to telephoto, plus a retracted position, as illustrated in the Zoom Position row of the chart of FIG. 7.

The exemplary code ring 72 may be formed as a solid electrically conductive ring wrapped around the barrel 60, with portions of the solid ring coated with an electrically nonconductive material to create the pattern. All electrically conductive portions are therefore electrically connected since they are formed of a single solid ring. The pattern may be detected by electrically grounding the common strip 92 of the code ring 72 or its associated electrically conductive contact 94 which presses against the common strip 92. Pull-up resistors are then connected to the other electrically conductive contacts 96, 100, and 102, which detect strips 0 84, 1 86, and 2 90, respectively, of the code ring 72. As the code ring 72 rotates, when the electrically conductive contacts 96, 100, and 102 are pressed against electrically nonconductive portions of the code ring 72, they will be pulled up to a high voltage by the pull-up resistors. When the electrically conductive contacts 96, 100, and 102 are pressed against electrically conductive portions of the code ring 72, they will be pulled down to ground through the common strip 92, registering a zero voltage. Thus, the changing voltage on the electrically conductive contacts 96, 100, and 102 can be measured to detect the pattern on the code ring 72.

Alternatively, the code ring 72 may have any form and structure indicating zoom positions that can be detected by a sensor, or any alterative system may be used which indicates discrete zoom positions in the zoom lens 12.

The pattern presented by the three encoded strips 84, 86, and 90 of the code ring 72 changes at each discrete zoom position offered by the zoom lens 12. Thus, as the barrel 60 and code ring 72 rotate, the set of electrically conductive contacts 74 detect the transitions of the code ring patterns. The zoom lens 12 stops when the set of electrically conductive contacts 74 detect the transition indicating the desired focal length or zoom position. That is, the DC zoom drive motor 70 begins braking when the transition is detected, but the zoom lens 12 continues to move a short distance, creating an offset from the desired position.

As mentioned above, the focal length of the zoom lens 12 is adjusted by pressing the zoom control switch 22 (FIG. 2). Because the zoom lens 12 has a discrete number of zoom positions, the zooming action of the zoom lens 12 generally does not stop immediately when the zoom control switch 22 is released. Rather, after the zoom control switch 22 is released, the zoom lens 12 continues zooming until the next discrete zoom position is reached. (Or until the next calibrated zoom position is reached, as will be described below.) For example, if the zoom lens 12 includes zoom positions with focal lengths of 12 mm and 14 mm, and the zoom control switch 22 is pressed causing the zoom lens 12 to zoom in from 12 mm then immediately released when the zoom lens 12 is at a focal length somewhere around 13 mm, the zoom lens 12 will continue to zoom in until the sensor detects the code ring 72 transition indicating the 14 mm focal length, at which point the zoom lens 12 will stop.

Figure 8:
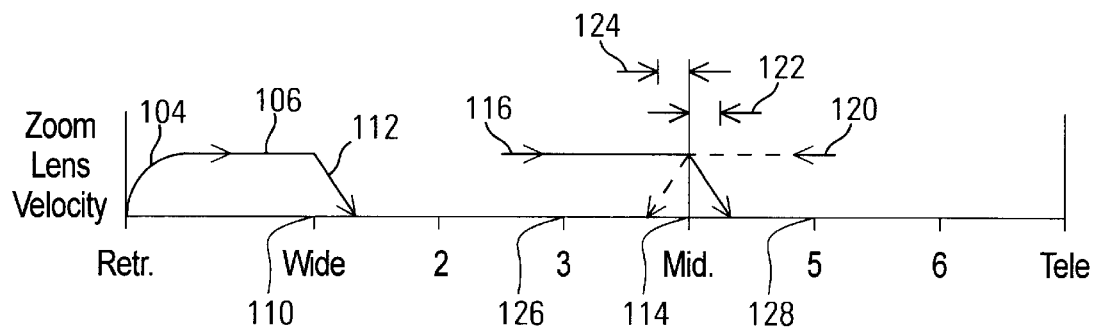
FIG. 8 is an exemplary chart of zoom velocity versus zoom lens zoom position for the zoom lens assembly of FIG. 6.

This exemplary combination of a DC zoom drive motor 70 and a discrete or granular zoom position sensor such as the code ring 72 described above enables the zoom lens 12 to be produced inexpensively and to have enough torque to rapidly zoom and retract into the optical device. However, it has limited this type of zoom lens to the predetermined number of zoom positions. Furthermore, it causes the zoom lens 12 to overshoot desired focal lengths because the zoom drive motor 70 cannot stop instantaneously after the zoom position sensor has detected the desired focal length. As illustrated in FIG. 8, the zoom lens 12 overshoots desired focal lengths, causing an offset in the focal length in the direction in which the zoom lens 12 was traveling. For example, the zoom lens 12 is brought from its retracted position by applying a constant voltage to the DC zoom drive motor 70, causing its velocity to increase 104 until it is constant 106, with the focal length of the zoom lens 12 increasing to the first zoom position 110. As soon as the zoom position sensor detects the desired zoom position, such as the wide angle position 110 on the rotating code ring 72, the power is removed from the DC zoom drive motor 70, causing it to stop. However, it takes a small amount of time for the velocity of the zoom lens 12 to decrease 112 to zero, causing the zoom lens 12 to overshoot the desired zoom position 110.

As mentioned above, the direction of the overshoot of desired zoom positions is dependent upon the zoom direction. For example, the 'zoom in' portion 44 of the zoom control switch 22 can be pressed to zoom in past the $3^{rd}$ zoom position 126 (FIG. 8). When the zoom control switch 22 is released at some point between the $3^{rd}$ zoom position 126 and the middle zoom position 114, the zoom lens 12 continues to zoom in until the zoom position sensor detects the pattern for the middle zoom position 114 on the code ring 72. At that point, the zoom lens 12 begins to stop, coming to rest a short distance 122 or focal length offset from the desired middle zoom position 114. With the zoom lens 12 approaching from the other direction, when the zoom out portion 46 of the zoom control switch 22 is pressed, the zoom lens 12 zooms out past the $5^{th}$ zoom position 128. When the zoom control switch 22 is released at some point between the $5^{th}$ zoom position 128 and the middle zoom position 114, the zoom lens 12 continues to zoom out until the zoom position sensor detects the pattern for the middle zoom position 114 on the code ring 72. At that point, the zoom lens 12 begins to stop, coming to rest a short distance 124 or focal length offset from the desired middle zoom position 114, but in the opposite direction from the offset 122 when zooming in.

In an exemplary zoom lens 12 in which a DC zoom motor drive is used it may take between about 100 to 300 ms for the zoom lens to travel between zoom positions, and about 50 ms for the motor to stop upon reaching a desired zoom position. Thus, an overshoot (e.g., 122) may cause a significant focal length error. By allowing the zoom lens 12 to approach zoom positions (e.g., 114) from either direction, either zooming in 116 or zooming out 120, the total tolerance in focal length for a given zoom position 114 is equal to the sum of the overshoot offsets in both directions 122 and 124. The magnitude of the focal length overshoot offsets are not necessarily the same in both directions, since the resistance of the zoom lens 12 to zooming may not be the same in both directions.

Calibration of the zoom lens 12 position enables the zoom lens 12 to be adjusted to focal lengths other than the predetermined zoom positions corresponding to code ring 72 transitions. Calibration of the zoom lens 12 position also enables the zoom lens 12 to be positioned more accurately at a desired focal length without offsets due to overshoot while braking. In the exemplary embodiment described herein, the control variable for the zoom lens 12 to be calibrated is the time during which power is applied to the DC zoom drive motor 70, because the DC zoom drive motor 70 runs on a constant DC voltage. Alternatively, other control variables may be used and calibrated, such as time of zooming movement, etc, or a combination of different control variables may be used. For example, the level of a variable DC voltage applied for a constant time to move the zoom lens 12 to a desired focal length may be measured, as applicable in the particular zoom lens and imaging device.

The exemplary zoom lens 12 is typically provided by a manufacturer along with a number of known specifications, such as the focal length obtained when stopping at each code ring 72 transition after zooming out, and perhaps several other specifications to compensate for backlash in the drive gears. Alternatively, these specifications can be determined by a series of physical measurements on a zoom lens 12.

Beginning with a number of known specifications, the zoom lens 12 calibration measures a series of unknown characteristics to improve focal length accuracy and precision. The calibration is performed by moving the zoom lens 12 through a preprogrammed sequence and measuring the control variable during the sequence. For the exemplary zoom lens 12 with a constant voltage DC zoom drive motor 70, the control variable is time, so measurements are made by time stamping the start of movement and calculating the elapsed time between the start of movement and the crossing of a code ring 72 transition. The zoom lens 12 calibration may be performed without additional position sensors or optical processes and may be performed automatically for each zoom lens 12 or for a zoom lens 12 design, depending on the accuracy desired.

Figure 9A:
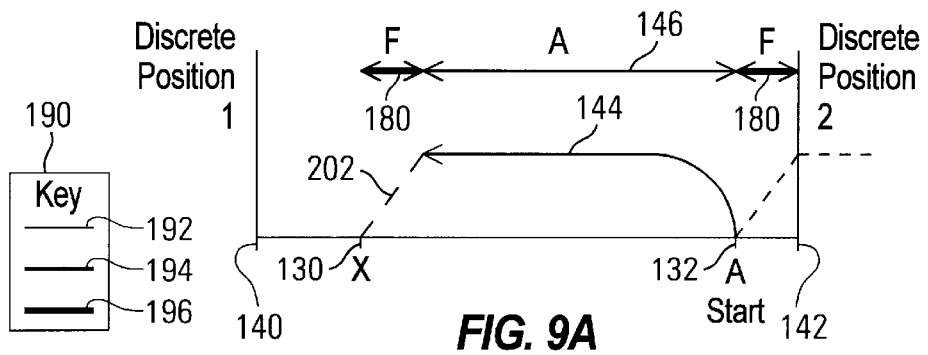
FIGS. 9A–9C are charts of zoom velocity versus zoom lens focal length illustrating exemplary movement from various zoom positions to a desired zoom position between two preset zoom positions.
Figure 9B:
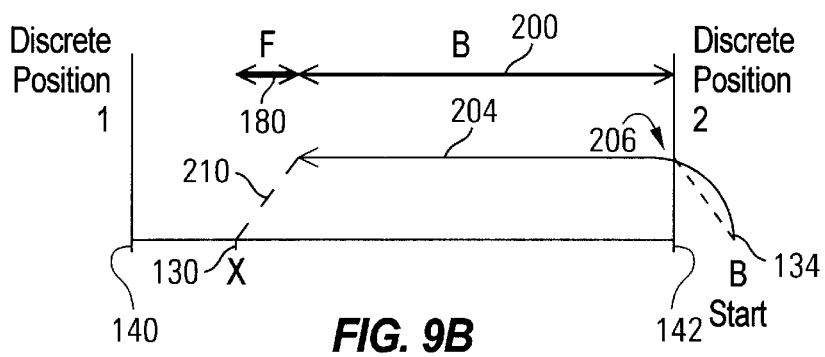
Figure 9C:
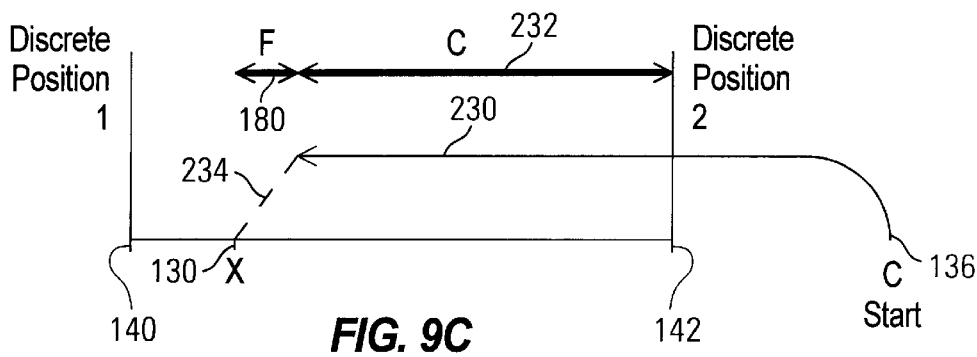

Referring now to FIGS. 9A–9C, the desired movement of the zoom lens 12 to a position X 130 from three different starting positions A 132, B 134 and C 136 is illustrated. The charts of FIGS. 9A–9B span a focal length range between a first discrete zoom position 140 and a second discrete zoom position 142, which may correspond to any two consecutive zoom positions at code ring 72 transitions. Position X 130 may be located at any desired focal length between the first and second zoom positions 140 and 142. (Note that the chart scale of FIGS. 9A–9C does not correspond to that of FIG. 8, but that the distance between discrete zoom positions or focal lengths has been expanded for clarity.)

In this case, position X is the position that is normally reached when zooming in from a focal length left of the chart in FIG. 9A to the first discrete zoom position 140. It is normally reached by applying a constant DC voltage to the DC zoom drive motor 70 until the code ring 72 transition for the first discrete zoom position 140 is detected, then continuing a small predetermined amount of time K 156 (see FIG. 10A), then turning off the DC voltage and applying brake control, and waiting for the zoom lens 12 to brake to position X. Although the extra time K 156 is not strictly necessary, it is often included in zoom operations to aid repeatability (in view of differences for individual zoom lenses) and may be specified by the zoom lens 12 manufacturer. Zooming in a small amount of time after the zoom position is detected guarantees repeatability for different zoom lenses with different tolerances, taking into account zoom lenses that cannot stop as fast as others.

Alternatively, position X may be at any focal length desired between the first and second discrete zoom positions 140 and 142. In this alternative embodiment, zoom lens 12 position calibration enables the addition of available focal lengths beyond those directly provided by the code ring 72, rather than enabling only zooming in both directions.

The desired zoom lens movement 144 in case A, illustrated in FIG. 9A, is to zoom out from a point A 132 to point X 130. Point A is reached by zooming out from a point to the right of the chart in FIG. 9A until the sensor detects discrete zoom position 2 142, then allowing the zoom lens to brake to point A 132. The desired zoom lens 12 movement is then to zoom out directly from point A 132 to point X 130 without having to pass discrete zoom position 1 140 and reverse directions. As there is no transition in the code ring 72 between point A 132 and point X 130, the calibration is needed to determine the time A 146 during which to apply power to the DC zoom drive motor 70 to move the desired amount.

Figure 10A:
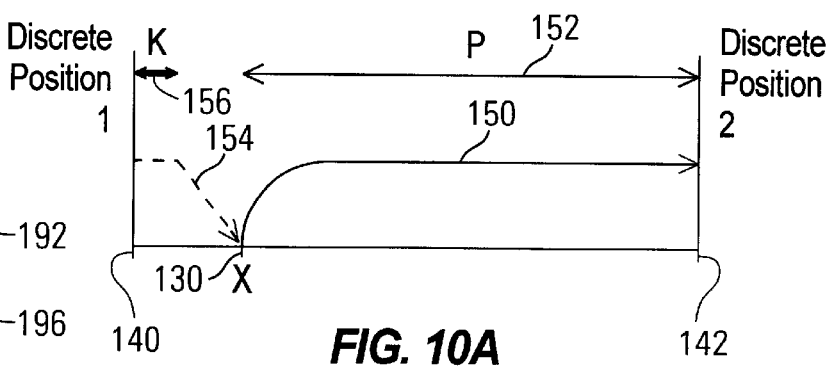
FIGS. 10A–10F are charts of zoom velocity versus zoom lens focal length illustrating zoom lens movements that contribute to an exemplary zoom lens calibration enabling the exemplary movement of FIG. 9A.

Two exemplary embodiments for calibrating the zoom lens 12 to enable the movement illustrated in FIG. 9A from point A 132 to point X 130 will be described. In the first exemplary embodiment, the zoom lens 12 is positioned at the desired position X 130 before the calibration begins. In the second exemplary embodiment, the calibration in one direction is known in advance, such as the overshoot time K 156 (FIG. 10A). Before describing the two exemplary zoom lens 12 calibration procedures, the individual zoom lens 12 calibration movements which are used in the two exemplary zoom lens 12 calibration procedures will be described. The order in which these calibration movements are performed is not important.

Referring now to FIG. 10A, the first calibration movement 150 measures the time P 152 required for the zoom lens 12 to zoom in from the target point X 130 to the second discrete zoom position 142. Point X 130 is reached by zooming in to the first discrete zoom position 140, including the overshoot caused by braking 154 and the extra zoom time K 156, if applicable. The zoom lens 12 begins from a standstill at point X 130, accelerates and passes the second discrete zoom position 142 at full speed (assuming that point X 130 is far enough from the second zoom position 142 to allow the zoom lens 12 to reach full speed).

Figure 10B:
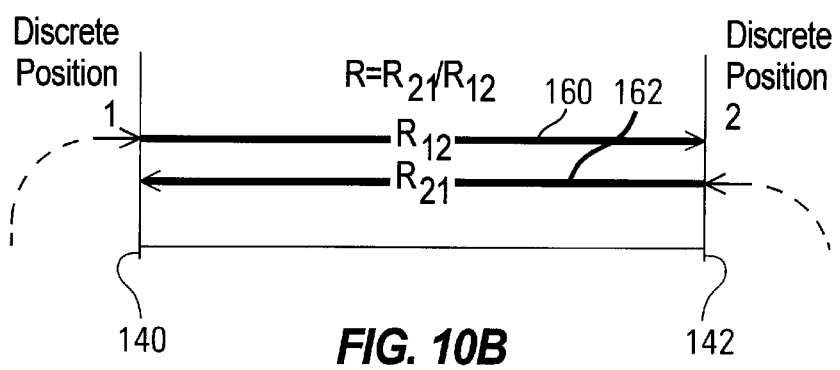

The second calibration movements 160 and 162 (FIG. 10B) are used to determine R, the ratio of zoom speed in one direction to zoom speed in the opposite direction. The ratio R is used to convert times of movement in one direction to the other direction. This is needed because zoom lenses 12 often move faster and more easily in one direction that the other due to the mechanical structure such as gearing, etc. The ratio R is calculated by, dividing R21 162, the time required to zoom out at full speed from the second zoom position 142 to the first zoom position 140, by R12 160, the time required to zoom in at full speed from the first zoom position 140 to the second zoom position 142. In both movements 160 and 162 the zoom lens 12 passes both the first and second zoom positions 140 and 142 at full speed.

Figure 10C:
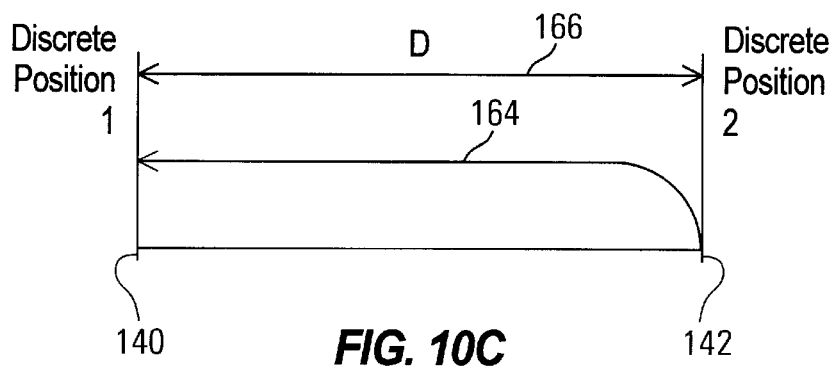

The third calibration movement 164 (FIG. 10C) is used to measure the time D 166 required to zoom out from a standstill at the second zoom position 142 until the first zoom position 140 is passed at full speed. (Note that many of these calibration movements can be performed in either direction with the resulting time measurement converted using the ratio R for the desired direction.)

Figure 10D:
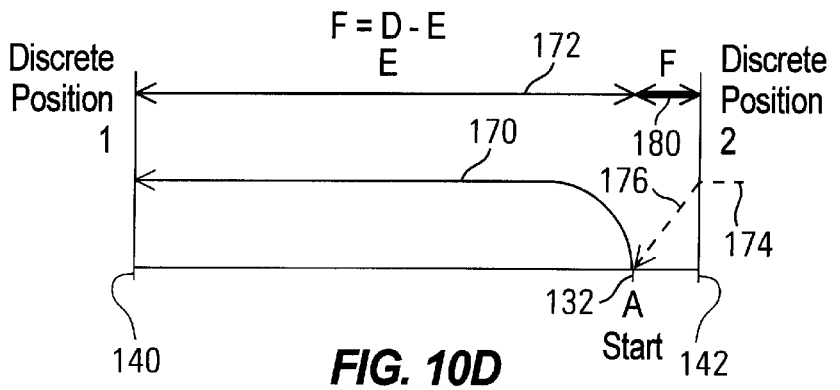

The fourth calibration movement 170 (FIG. 10D) is used to measure the time E 172 required to zoom out from the starting point 132 in case A to the first zoom position 140, starting from a standstill and passing the first zoom position 140 at full speed (assuming that the starting point 132 is far enough from the first zoom position 140 to allow the zoom lens 12 to reach full speed). The starting point 132 for case A is reached in this example by zooming out 174 until the code ring 72 transition for the second zoom position 142 is detected, then braking 176.

The time F 180 required for the zoom lens 12 to zoom out at full speed over the braking distance can be calculated by subtracting time E 172 from time D 166 (F=D−E). Note that this is not the braking time, but the time of full speed motion over the braking distance. Time F 180 is calculated for zooming out movement because times D 166 and E 172 are also both for zooming out movement.

Figure 10E:
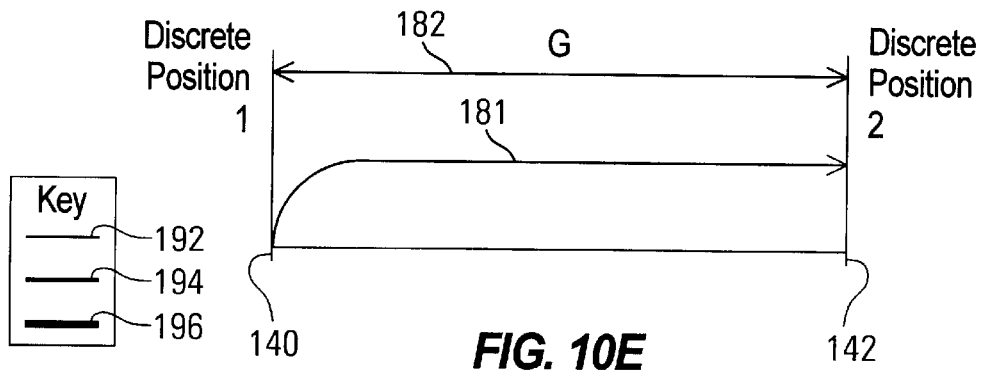
Figure 10F:
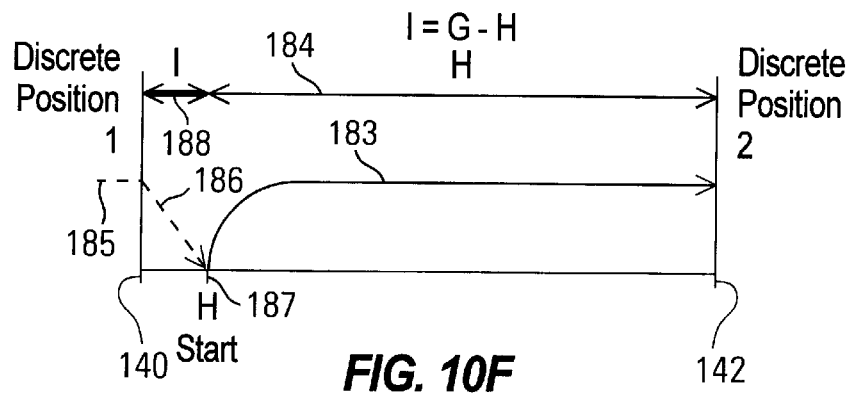

The third and fourth zooming out calibration movements 164 and 170 that are used to calculate time F 180 are also repeated in the zooming in direction. Time F 180 is the time needed to zoom out at full speed over the zooming out braking distance. Time F 180 can be multiplied by ratio R to adapt time F 180 to the time needed to zoom in at full speed over the zooming out braking distance. However, because ratio R is calculated based on movements over constant distances in different directions, it compensates for different directions of movement, not different distances. Because the braking distance may be different after zooming in than after zooming out, the third and fourth zooming out calibration movements 164 and 170 are repeated in the zooming in direction to calculate the time I 188 (FIG. 10F) needed to zoom in at full speed over the zooming in braking distance. Time I 188 can then be divided by ratio R to adapt time I 188 to the time needed to zoom out at full speed over the zooming in braking distance.

The fifth calibration movement 181 (FIG. 10E) is used to measure the time G 182 required to zoom in from a standstill at the first zoom position 140 until the second zoom position 142 is passed at full speed. (The time G 182 may alternatively be calculated by multiplying time D 166 by ratio R, as the cover the same distance in opposite directions.)

The sixth calibration movement 183 (FIG. 10F) is used to measure the time H 184 required to zoom in from a starting point H 187 to the second zoom position 142, starting from a standstill and passing the second zoom position 142 at full speed. The starting point H 187 is reached in this example by zooming in 185 to the first zoom position 140, then braking 186. (Note that time H 184 is measured, not calculated using ratio R, because the starting position H 187 may not lie at the same distance from the first zoom position 140 that starting position A 132 lies from the second zoom position 142. This possible difference is due to different braking distances in different directions.) The time I 188 required for the zoom lens 12 to zoom in at full speed over the zooming in braking distance can be calculated by subtracting time H 184 from time G 182 (I=G−H). Note that this is not the braking time, but the time of full speed motion over the braking distance. Time I 188 is calculated for zooming in movement because times G 182 and H 184 are also both for zooming in movement.

A time L (not shown) consisting of the time required to zoom over the backlash between the optical lens position and the discrete position sensors may also be included. Backlash refers to the position difference caused by mechanical looseness in gears and other components, in this case between the optical lens and the DC zoom drive motor 70. Time L is generally specified by the zoom lens 12 manufacturer.

The imaging device containing the zoom lens 12 may internally measure all the necessary times for zoom lens 12 calibration by moving the DC zoom drive motor 70 through a preprogrammed sequence of movements. Measurements are made by time-stamping the start of movement and then calculating the elapsed time between the start of movement and the crossing of the discrete position sensor. This calibration sequence may be initiated by a command sent over a communication link from an external computer, by button presses or by internal firmware determining that calibration is necessary, etc.

Referring now to FIGS. 9A and 10A–10D simultaneously, the first exemplary calibration procedure enabling the zoom lens movement 144 in case A will be described. In this case, the zoom lens 12 starts at a position 132 between the first and second zoom positions 140 and 142 and near the second zoom position 142. The zoom lens 12 achieved this starting location 132 by zooming out at full speed and braking when the code ring 72 transition is detected for the second zoom position 142. To get to position X 130, the zoom lens 12 zooms out for time period A 146, then brakes to a stop.

It is important to note that a time to zoom from one zoom position to another in the exemplary embodiment described herein refers to the time during which power must be applied to the DC zoom drive motor 70 to move the zoom lens between the zoom positions, and does not include the braking or coasting time. Alternatively, the calibration procedure may be altered to include braking time.

Time period A 146 to achieve the desired motion A 144 is calculated in the first exemplary calibration procedure according to the following equation:

$$A = P*R - 2*F + L \quad \text{(Equation 1)}$$

Again, the zoom lens 12 is first positioned at point X 130 before beginning the calibration process, either manually or automatically. Times P 152, R12 160 and R21 162 are measured and the ratio R is calculated by dividing R21 162 by R12 160. Time P 152 is converted from zooming in to zooming out motion by multiplying by R to correspond to the desired zooming out of the movement 144 in case A. Times D 166 and E 172 are measured and time F 180 is calculated by subtracting time E 172 from time D 166. Time F 180 is multiplied by two and subtracted from the time for the movement 144 in case A. Finally, backlash can be accounted for by adding time L.

Equation 1 can also be understood by keeping in mind the distance and speed characteristics of the calibration components (A 144, P 150, R12 160, R21 162, D 164, and E 170). The key 190 in FIG. 9A graphically indicates zoom lens 12 movement speed. The thinnest line weight 192 used on the time A 146 over movement A 144 and time P 152 over movement P 150 indicates the slowest overall movement because it includes the time to accelerate from a standstill. The medium line weight 194 used on time B 200 in FIG. 9B includes some acceleration time but not from a standstill. The heaviest line weight 196 used in time F 180 indicates movement at constant top speed.

Time A 146 is the time to zoom over the distance from point A 132 to point X 130 (this time specifically excludes lens movement during braking time). The speed of this movement 144 includes the time to accelerate from a standstill, as indicated by the thin line weight of the line representing time A 146 in FIG. 9A.

The calibration calculation begins with time P 152 for movement P 150, which is the time to zoom in over the distance from point X 130 to zoom position two 142. This includes acceleration from a standstill, as indicated by the thin line weight of the line representing time P 152 in FIG. 10A. Thus, movement P 150 differs from the desired movement A 144 in three particulars. First, the direction of movement P 150 is opposite the desired movement A 144. Second, movement P 150 includes a full speed portion between point A 132 and the second zoom position 142. Third, the movement P 150 includes a full speed portion equivalent to the distance 202 covered while the zoom lens 12 is braking to point X 130 after movement A 144.

Note that although this distance is not covered at full speed after the movement A 144, we are beginning the calibration calculation with movement P 152 which does cover that equivalent distance at full speed. In other words, movement P 150 covers the distance between position X 130 and zoom position 2 142 at full speed other than a single period of acceleration from a standstill (and in the opposite direction). Movement A 144 is also shorter than movement P 150 by the distance between position A 132 and zoom position 2 142, and the distance covered during braking 144 after movement A 144.

Therefore, the first difference (direction of movement) may be corrected for by multiplying time P 152 by ratio R. The second difference (the full speed portion between point A 132 and zoom position 2 142) may be corrected for by subtracting the time to cover that distance at full speed, which is time F 180. Time F 180 is covered at full speed, hence the thickest line weight 196. The third difference (the braking distance after movement A 144) covers the same distance as the second difference, so time F 180 is subtracted from reversed time P 152 a second time. Finally, the time L to cover the backlash distance can be added. L should be specified for motion in the proper direction according to the other terms of the equation.

As mentioned above, the time A 146 during which power is applied to the DC zoom drive motor 70 to move from starting position A 132 to position X 130 can also be calculated by the second exemplary calibration procedure described below. Because movement P 150 (which starts at position X 130) is not used in this embodiment, the zoom lens 12 need not be positioned at position X 130 during the calibration sequence. In this embodiment the time K 156, generally specified by the zoom lens manufacturer, is used in the calibration calculation. Time K 156 is the time during which the DC zoom drive motor 70 is powered to move the zoom lens 12 from the first zoom position 140 to the desired target zoom position X 130.

In the second exemplary calibration procedure, time period A 146 to achieve the desired motion A 144 is calculated according to the following equation:

$$A=E-F-(I+K)*R+L \qquad \text{(Equation 2)}$$

This exemplary calibration procedure begins with movement E 170 which begins at starting point A 132 and zooms out, as does target movement A 144. Movement E 170 differs from movement A 144 in that it continues at full speed all the way to the first zoom position 140 rather than stopping and braking to position X 130. Therefore F 180, which is the time to zoom out at full speed over the braking distance, is subtracted to compensate for the braking distance between the end of motion A 144.

The next segment of movement E 170 to subtract is that corresponding to K 156 and the braking distance 154 shown to the left of position X 130 in FIG. 10A, or time I 188. As K 156 and time I 188 both correspond to zooming in movement, and they are being subtracted from zooming out movement E 170, they should be converted to zooming out movement by multiplying by ratio R.

Finally, the time L to cover the backlash distance can be added.

Please note that the exemplary calibration procedures described herein are not limiting. Calibration movements can be performed in any desired sequence, and there may be a number of suitable algorithms enabling movement to a desired location from a given starting point.

Referring now to FIG. 9B, an exemplary calibration will be described that enables movement of the zoom lens 12 to a position X 130 from starting position B 134. Starting position B 134 is reached by zooming in at full speed until zoom position two 142 is reached, then braking to a stop at starting position B 134. When zooming out in movement B 204, the zoom lens 12 is still accelerating when it passes zoom position two 142. Zoom lens 12 thus passes zoom position two 142 at a speed 206 somewhat lower than full speed. To reach position X 130, the DC zoom drive motor 70 in the zoom lens 12 is powered to accelerate the zoom lens 12 toward zoom position two 142, then remains powered for calibrated time B 200 after passing zoom position two 142. The zoom lens 12 then brakes 210 to a stop at position X 130.

Calibrated time B 200 enabling movement B 204 to position X 130 is calculated based on time A 146 and an additional calibration measurement according to the following equation:

$$B=Z-(E-A) \qquad \text{(Equation 3)}$$

Figure 11A:
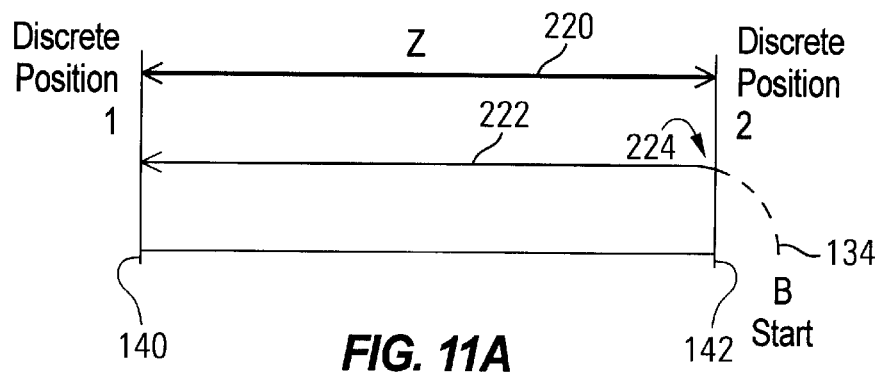
FIG. 11A is a chart of zoom velocity versus zoom lens focal length illustrating a zoom lens movement that contributes to an exemplary zoom lens calibration enabling the exemplary movement of FIG. 9B.

The additional calibration measurement used for exemplary equation 3 is the measurement of time Z 220 (FIG. 11A), the time to zoom out 222 from zoom position two 142 to zoom position one 140, mainly at full speed but including some acceleration time 224. The zoom lens 12 begins at starting point B 134 and zooms out to zoom position one 140, still accelerating as zoom position two 142 is passed. The time Z 220 is measured as the zoom lens 12 moves from zoom position two 142 to zoom position one 140. Note that movement B 204 includes some acceleration time 206 between zoom positions one 140 and two 142, thus time B 200 is indicated with a medium weight line 194.

Time A 146 is subtracted from time E 172, leaving time of full speed zooming-out motion between the end of movement A 144 and zoom position one 140. This time of full speed zooming-out motion is subtracted from time Z 220, resulting in calibrated time B 200, the time during which the DC zoom drive motor 70 is powered to move the zoom lens 12 from zoom position two 142 (almost at full speed as it passes zoom position two 142) until it brakes to position X 130.

In terms of the speed of the calibration movements, note that time Z 220 and time B 200 are both indicated by medium weight lines 194, indicating that both times are for movement at full speed except for a small portion of acceleration in each (224 and 206). The difference between the two is a period of full speed movement between the end of movement B 204 and zoom position one 140, which is accounted for by subtracting the difference of times E 172 and A 146 from time Z 220.

Referring now to FIG. 9C, an exemplary calibration will be described that enables movement of the zoom lens 12 to a position X 130 from starting position C 136. Starting position C 136 is any point far enough beyond zoom position two 142 that the zoom lens 12 can zoom out and accelerate to full speed before reaching zoom position two 142. This means that when zooming out in movement C 230, the zoom lens 12 is moving at full speed when it passes zoom position two 142. To reach position X 130 during movement C 230, the DC zoom drive motor 70 in the zoom lens 12 is powered to accelerate the zoom lens 12 to full speed toward zoom position two 142, then remains powered for calibrated time C 232 after passing zoom position two 142. The zoom lens 12 then brakes 234 to a stop at position X 130.

Calibrated time C 232 enabling movement C 230 to position X 130 is calculated based on time A 146 and an additional calibration measurement according to the following equation:

$$C=Y-(E-A) \qquad \text{(Equation 4)}$$

Figure 11B:
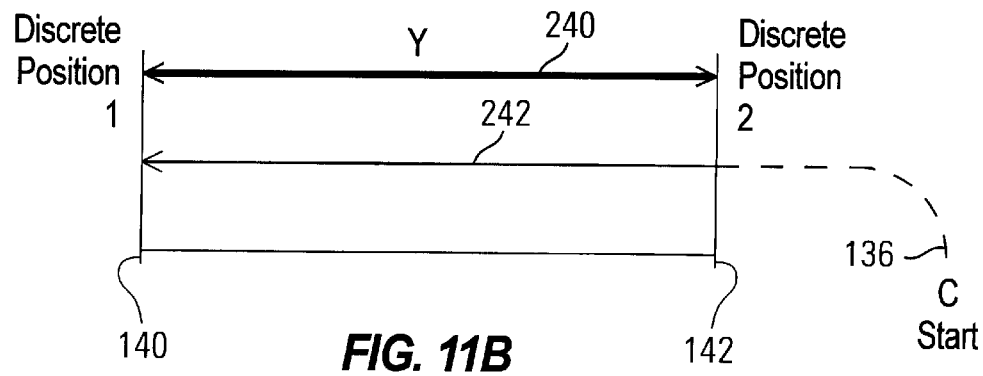
FIG. 11B is a chart of zoom velocity versus zoom lens focal length illustrating a zoom lens movement that contributes to an exemplary zoom lens calibration enabling the exemplary movement of FIG. 9C.

The additional calibration measurement used for exemplary equation 4 is the measurement of time Y 240 (FIG. 11B), the time to zoom out 242 from zoom position two 142 to zoom position one 140 at full speed. The zoom lens 12 begins at starting point C 136, passing zoom position two 142 at full speed and continuing to zoom position one 140. The time Y 240 is measured as the zoom lens 12 moves between zoom position two 142 and zoom position one 140. Note that movement C 230 is performed entirely at full speed between zoom positions one 140 and two 142, thus time C 232 is indicated with a heavy weight line 196.

Time A 146 is subtracted from time E 172, leaving time of full speed zooming-out motion between the end of movement A 144 and zoom position one 140. This time of full speed zooming-out motion is subtracted from time Y 240, resulting in calibrated time C 232, the time during which the DC zoom drive motor 70 is powered to move the zoom lens 12 from zoom position two 142 (at full speed as it passes zoom position two 142) until it brakes to position X 130.

In terms of the speed of the calibration movements, note that time Y 240 and time C 232 are both indicated by heavy weight lines 196, indicating that both times are for movement at full speed. The difference between the two is a period of full speed movement between the end of movement C 230 and zoom position one 140, which is accounted for by subtracting the difference of times E 172 and A 146 from time Z 220.

Figure 12:
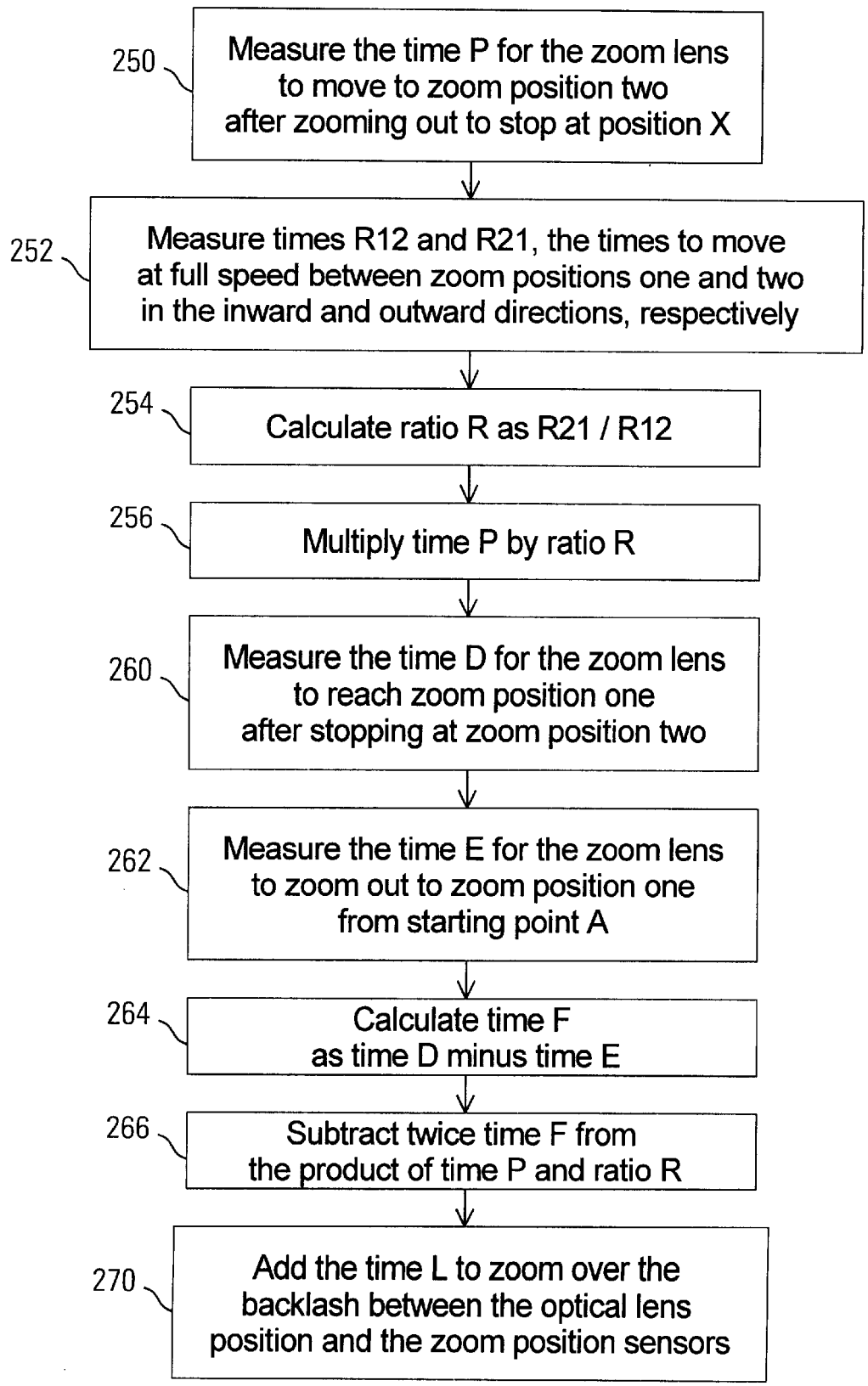
FIG. 12 is a flowchart illustrating a first exemplary calibration procedure enabling movement from a first starting zoom position to a target zoom position.

These exemplary calibration procedures are summarized in the flowcharts of FIGS. 12–15. The flowchart of FIG. 12 summarizes the calibration procedure to generate time A 146 using equation 1. As mentioned above, the order in which the calibration movements and calculations are completed is not important.

The time P 152 is measured 250, the time for the lens motor to move to zoom position two 142 after zooming out to stop at position X 130. Time R12 160 and time R21 162 are measured 252, the times to move at full speed between zoom positions one 140 and two 142 in the inward and outward directions, respectively. Ratio R is calculated 254 as R21 162 divided by R12 160, and time P 152 is multiplied 256 by ratio R. Time D 166 is measured 260, the time for the zoom lens 12 to reach zoom position one 140 after stopping at zoom position two 142. Time E 172 is measured 262, the time to zoom out to zoom position one 140 from starting point A 132. Time F 180 is calculated 264 as time D 166 minus time E 172, and time F 180 is subtracted twice 266 from the product of time P 152 and ratio R. Finally, time L is added 270, the time to zoom over the backlash between the optical lens position and the zoom position sensors.

Figure 13:
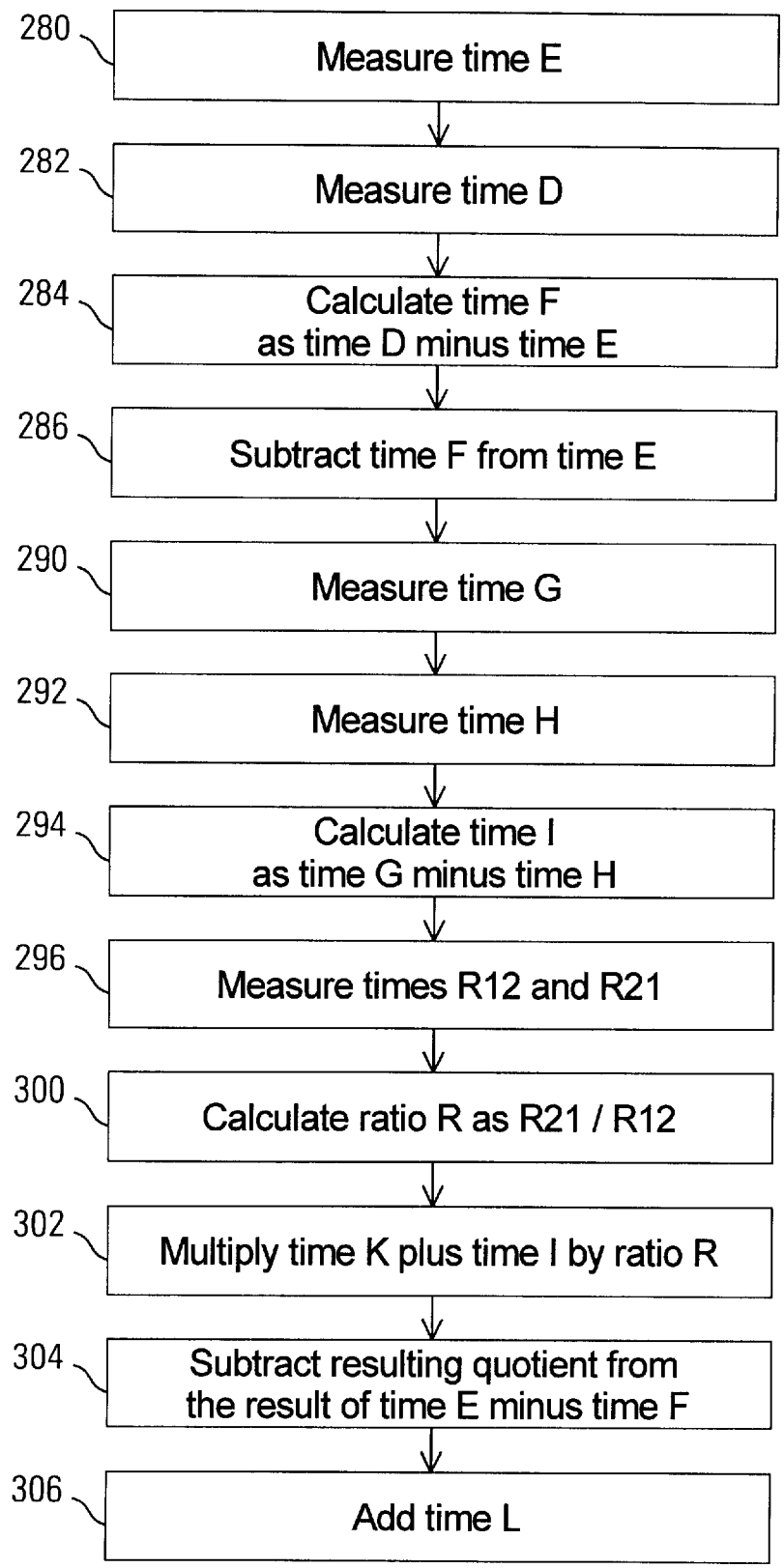
FIG. 13 is a flowchart illustrating a second exemplary calibration procedure enabling movement from a first starting zoom position to a target zoom position.

The flowchart of FIG. 13 summarizes the calibration procedure to generate time A 146 using equation 2. Time E 172 is measured 280, time D 166 is measured 282, and time F 180 is calculated 284 as time D 166 minus time E 172. Time F 180 is subtracted 286 from time E 172. Time G 182 is measured 290, time H 184 is measured 292, and time I 188 is calculated 294 as time G 182 minus time H 184. Times R12 160 and R21 162 are measured 296 and ratio R is calculated 300 as R21 162 divided by R12 160. Time K 156 plus time I 188 is multiplied 302 by ratio R and subtracted 304 from the result of time E 172 minus time F 180. Finally, time L is added 306.

Figure 14:
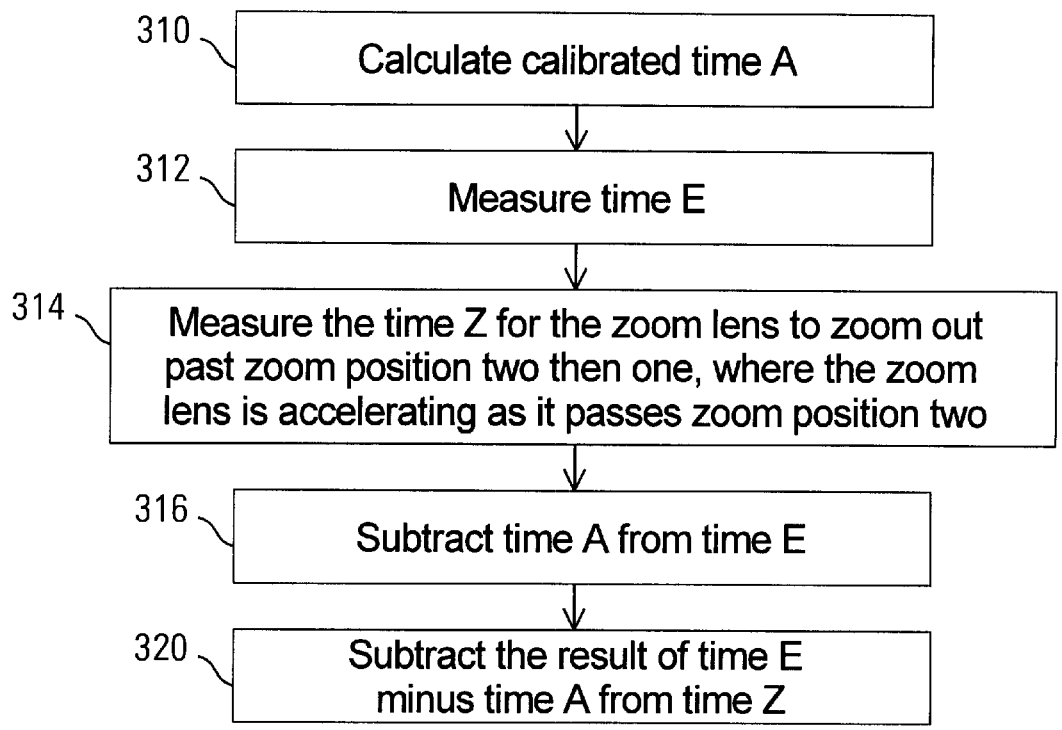
FIG. 14 is a flowchart illustrating an exemplary calibration procedure enabling movement from a second starting zoom position to a target zoom position.

The flowchart of FIG. 14 summarizes the calibration procedure to generate time B 200 using equation 3. Calibrated time A 146 is calculated 310, using a calibration procedure such as that summarized in FIGS. 12 or 13. Time E 172 is measured 312. Time Z 220 is measured 314, the time to zoom out past zoom position two 142 and zoom position one 140, where the zoom lens 12 is still accelerating from starting point B 134 as it passes zoom position two 142. Time A 146 is subtracted 316 from time E 172, and the result is subtracted 320 from time Z 220.

Figure 15:
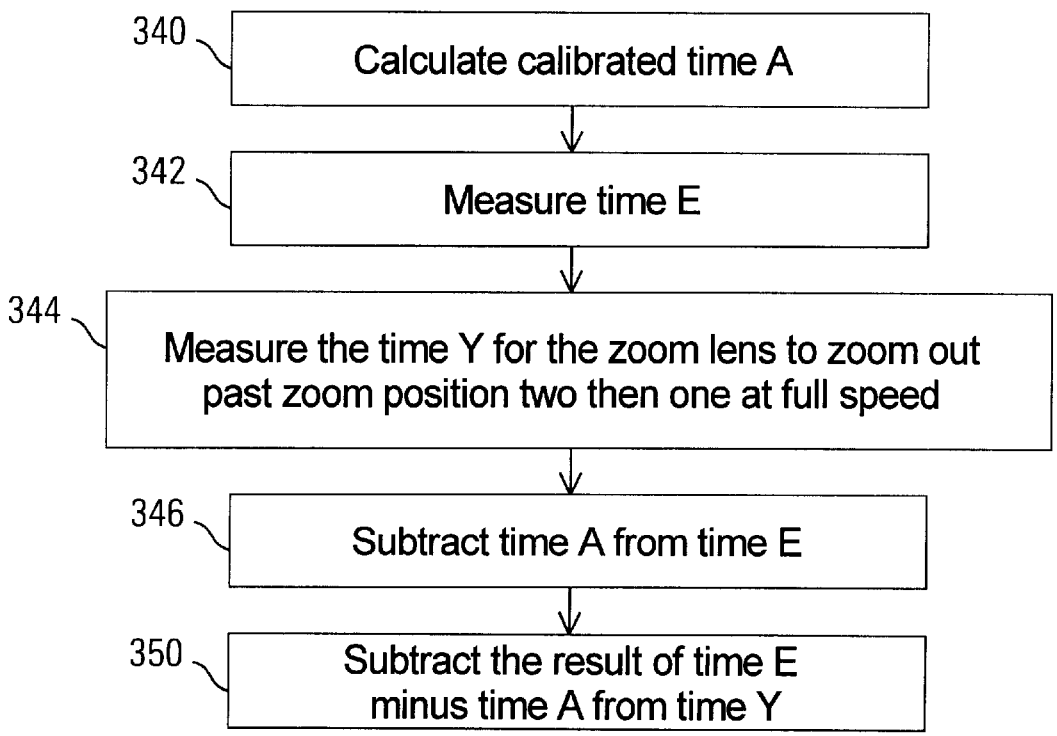
FIG. 15 is a flowchart illustrating an exemplary calibration procedure enabling movement from a third starting zoom position to a target zoom position.

The flowchart of FIG. 15 summarizes the calibration procedure to generate time C 232 using equation 4. Calibrated time A 146 is calculated 340, using a calibration procedure such as that summarized in FIGS. 12 or 13. Time E 172 is measured 342. Time Y 240 is measured 344, the time to zoom out past zoom position two 142 and zoom position one 140 at full speed. Time A 146 is subtracted 346 from time E 172, and the result is subtracted 350 from time Y 240.

A number of exemplary embodiments have been described above for reaching a target focal length or position X 130 from a number of starting positions 132, 134 and 136. However, the zoom lens position calibration described herein is not limited to these exemplary embodiments including starting and ending position. The calibration procedures may be adapted to any desired starting and ending positions. Furthermore, the method of initiating calibration, the order in which calibration movements are performed, and the calibration calculations may all be adapted as desired without departing from the scope of the inventive concepts disclosed herein.

For example, the exemplary target position X 130 has been placed at the location the zoom lens 12 normally ends on when zooming in without calibration. This exemplary location was chosen to illustrate that calibration enables the zoom lens 12 can come to rest on a given focal length from either direction, even with imprecise and/or low-resolution focal length position sensors. However, the zoom lens position calibration disclosed herein applies equally well to target zoom positions at other locations, such as between predetermined zoom positions 140 and 142. In this way, an imaging device with this type of zoom lens 12 can be programmed to provide many more focal length choices than the few automatically provided by the zoom lens 12 sensors.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of calibrating a zoom lens, comprising:
   performing at least one focal length adjustment of said zoom lens;
   collecting a time period measurement for each said at least one focal length adjustment; and
   calculating a calibrated time to zoom to a desired focal length based on said time period measurements.

2. The method of claim 1, wherein said calibrated time enables said zoom lens to be zoomed from an initial focal length to said desired focal length.

3. The method of claim 2, wherein said initial focal length and said desired focal length both lie between two adjacent focal lengths that are detectable by a sensor in said zoom lens.

4. The method of claim 2, wherein said desired focal length lies between two adjacent focal lengths that are detectable by a sensor in said zoom lens and said initial focal length lies beyond one of said two adjacent focal lengths.

5. The method of claim 4, wherein said zoom lens is still accelerating as it passes said one of said two adjacent focal lengths from said initial focal length to said desired focal length.

6. The method of claim 4, wherein said zoom lens is traveling at top speed as it passes said one of said two adjacent focal lengths from said initial focal length to said desired focal length.

7. The method of claim 1, wherein each said time period measurement is collected for movement of said zoom lens between two adjacent discrete zoom positions that are detectable by a sensor in said zoom lens.

8. The method of claim 1, wherein at least one said time period measurement indicates a time required for said zoom lens to zoom in from said desired focal length to an adjacent discrete zoom position that is detectable by a sensor in said zoom lens.

9. The method of claim 1, wherein said at least one said time period measurement comprises a first and a second measurement, said first and second measurements being times required for said zoom lens to zoom at full speed between two adjacent discrete zoom positions that are detectable by a sensor in said zoom lens, said first and second measurements being for movement in opposite directions, the method further comprising calculating a ratio by dividing said first measurement by said second measurement.

10. The method of claim 1, wherein at least one said time period measurement indicates a time required for said zoom lens to zoom between two adjacent discrete zoom positions that are detectable by a sensor in said zoom lens, wherein said zoom lens begins from a stop at one of said two adjacent discrete zoom positions.

11. The method of claim 1, wherein one said at least one focal length adjustment comprises zooming to a first discrete zoom position and braking to a stop position, then zooming past a second adjacent discrete zoom position, and wherein said time period measurement for said one focal length adjustment indicates a time required for said zoom lens to zoom from said stop position to said second adjacent discrete zoom position.

12. The method of claim 1, wherein said calculating a calibrated time partly comprises calculating a time for said zoom lens to zoom at full speed over a braking distance, said braking distance comprising a distance required for said zoom lens to brake to a stop from full speed.

13. The method of claim 1, wherein at least one said time period measurement indicates a time required for said zoom lens to zoom between two adjacent discrete zoom positions that are detectable by a sensor in said zoom lens, wherein said zoom lens is accelerating as it passes a first of said two adjacent discrete zoom positions.

14. The method of claim 1, wherein at least one said time period measurement indicates a time required for said zoom lens to zoom between two adjacent discrete zoom positions that are detectable by a sensor in said zoom lens, wherein said zoom lens is moving at full speed as it passes a first of said two adjacent discrete zoom positions.

15. The method of claim 1, wherein said calibrated time enables said zoom lens to be zoomed from an initial focal length to said desired focal length, and wherein said at least one focal length adjustment comprises a plurality of zoom movements near a first focal length and a second focal length, said first and second focal lengths being adjacent focal lengths that are detectable by a sensor in said zoom lens, and wherein said each time period measurement comprises:

a first measurement indicating a time for said zoom lens to zoom in to said second focal length after zooming in to a stop at said desired focal length;

a second measurement indicating a time to zoom out at full speed between said second and first focal lengths;

a third measurement indicating a time to zoom in at full speed between said first and second focal lengths;

a fourth measurement indicating a time to zoom from a stop at said second focal length to said first focal length; and a fifth measurement indicating a time to zoom out from said initial focal length to said first focal length;

and wherein said calculating a calibrated time comprises multiplying said first measurement by a quotient of said second and third measurements and subtracting twice a result of said fourth measurement minus said fifth measurement.

16. The method of claim 1, wherein said calibrated time enables said zoom lens to be zoomed from an initial focal length to said desired focal length, and wherein said at least one focal length adjustment comprises a plurality of zoom movements near a first focal length and a second focal length, said first and second focal lengths being adjacent focal lengths that are detectable by a sensor in said zoom lens, and wherein said each time period measurement comprises:

a first measurement indicating a time to zoom out at full speed between said second and first focal lengths;

a second measurement indicating a time to zoom in at full speed between said first and second focal lengths;

a third measurement indicating a time to zoom from a stop at said second focal length to said first focal length;

a fourth measurement indicating a time to zoom out from said initial focal length to said first focal length; and a fifth measurement indicating a time to zoom in to said second focal length after zooming in to said first focal length and braking to a stop;

and wherein said calculating a calibrated time comprises subtracting a result of said third measurement minus said fourth measurement from said fourth measurement, and further forming an intermediary value comprising a sum of a time required to power said zoom lens to zoom in from said first focal length to said desired focal length and a result of said third measurement converted for an opposite direction minus said fifth measurement, and further subtracting said intermediary value multiplied by a quotient of said first and second measurements.

17. The method of claim 1, wherein said calibrated time enables said zoom lens to be zoomed from an initial focal length to said desired focal length, and wherein said at least one focal length adjustment comprises a plurality of zoom movements near a first focal length and a second focal length, said first and second focal lengths being adjacent focal lengths that are detectable by a sensor in said zoom lens, and wherein said each time period measurement comprises:

a first measurement indicating a time to zoom out from a starting focal length to said first focal length, said starting focal length being reached by zooming out to said second focal length and braking to said starting focal length; and a second measurement indicating a time zoom out from said second focal length to said first focal length after starting from said initial focal length, wherein said zoom lens is still accelerating as said second focal length is passed;

and wherein said calculating a calibrated time comprises calculating an intermediate calibrated time to zoom from said starting focal length to said desired focal length and subtracting said first measurement from said intermediate calibrated time and adding said second measurement.

18. The method of claim 1, wherein said calibrated time enables said zoom lens to be zoomed from an initial focal length to said desired focal length, and wherein said at least one focal length adjustment comprises a plurality of zoom movements near a first focal length and a second focal length, said first and second focal lengths being adjacent focal lengths that are detectable by a sensor in said zoom lens, and wherein said each time period measurement comprises:

a first measurement indicating a time to zoom out from a starting focal length to said first focal length, said starting focal length being reached by zooming out to said second focal length and braking to said starting focal length; and a second measurement indicating a time to zoom out from said second focal length to said first focal length after starting from said initial focal length, wherein said zoom lens passes said second focal length at full speed;

and wherein said calculating a calibrated time comprises calculating an intermediate calibrated time to zoom from said starting focal length to said desired focal length and subtracting said first measurement from said intermediate calibrated time and adding said second measurement.

19. A method of calibrating a zoom lens, comprising:

zooming said zoom lens over at least one range of focal lengths;

collecting measurements during said zooming of at least one control variable that varies as a focal length of said zoom lens varies; and calculating a value of said at least one control variable based on said measurements.

20. The method of claim 19, wherein said at least one control variable comprises time.

21. The method of claim 19, wherein said at least one of said measurements is bounded as a discrete focal length is reached in said zoom lens.

22. The method of claim 21, wherein reaching said discrete focal length is detected by a discrete zoom position sensor operatively associated with said zoom lens.

23. The method of claim 19, wherein said at least one of said measurements is bounded as zooming movement in said zoom lens begins.

24. The method of claim 19, wherein said at least one of said measurements is bounded as zooming movement in said zoom lens ends.

25. The method of claim 19, wherein said at least one of said measurements is bounded as power is applied to said zoom lens to begin zooming movement.

26. The method of claim 19, wherein said at least one of said measurements is bounded as power is removed from said zoom lens to end zooming movement.

27. An imaging device, comprising:

a zoom lens having at least one sensor that senses when said zoom lens is adjusted to one of a plurality of discrete focal lengths;

means for zooming said zoom lens over at least one focal length range while collecting measurements of a control variable; and means for calculating a value for said control variable based on said measurements, wherein said value for said control variable enables said zoom lens to be positioned at a particular focal length.

28. The imaging device of claim 27, wherein said particular focal length is a focal length other than said plurality of discrete focal lengths.

29. The imaging device of claim 27, wherein said control variable comprises time.

30. The imaging device of claim 27, wherein said control variable varies as a focal length of said zoom lens is adjusted.

31. The imaging device of claim 27, wherein at least one of said measurements is regulated at least in part by detection of one of said discrete focal lengths.

32. The imaging device of claim 27, wherein at least one of said measurements is regulated at least in part by application of power to said zoom lens to begin zooming movement.

33. The imaging device of claim 27, wherein at least one of said measurements is regulated at least in part by removal of power from said zoom lens to end zooming movement.

* * * * *